United States Patent
Yu et al.

(10) Patent No.: US 12,466,460 B2
(45) Date of Patent: Nov. 11, 2025

(54) MOWER AND STEERING CONTROL METHOD THEREOF

(71) Applicant: Globe (Jiangsu) Co., Ltd., Changzhou (CN)

(72) Inventors: Wanzhao Yu, Changzhou (CN); Qunli Wei, Changzhou (CN); Hui Chen, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 999 days.

(21) Appl. No.: 17/553,837

(22) Filed: Dec. 17, 2021

(65) Prior Publication Data

US 2022/0204070 A1 Jun. 30, 2022

(30) Foreign Application Priority Data

Dec. 25, 2020 (CN) .......................... 202011565978.4
Dec. 25, 2020 (CN) .......................... 202023181850.6

(51) Int. Cl.
| | |
|---|---|
| *B62D 1/12* | (2006.01) |
| *A01D 34/82* | (2006.01) |
| *B62D 5/04* | (2006.01) |
| *A01D 101/00* | (2006.01) |

(52) U.S. Cl.
CPC .............. *B62D 1/12* (2013.01); *A01D 34/824* (2013.01); *B62D 5/046* (2013.01); *A01D 2101/00* (2013.01)

(58) Field of Classification Search
CPC .......... B62D 1/12; B62D 5/046; B62D 11/02; B62D 51/02; A01D 34/824; A01D 2101/00; A01D 2034/6843; A01D 34/46; A01D 34/47; A01D 34/67; A01D 34/69; A01D 34/00
USPC ........................................................ 180/6.24
See application file for complete search history.

(56) References Cited

U.S. PATENT DOCUMENTS

| | | | |
|---|---|---|---|
| 5,511,367 A * | 4/1996 | Powers | A01D 34/6806 D15/18 |
| 5,518,079 A | 5/1996 | Zvolanek | |
| 5,822,961 A | 10/1998 | Busboom | |
| 5,913,802 A | 6/1999 | Mullet | |
| 7,325,388 B2 | 2/2008 | Wright et al. | |
| 9,867,331 B1 * | 1/2018 | Siudyla | B62D 11/04 |
| 2008/0190085 A1 | 8/2008 | Hoffman et al. | |
| 2016/0101693 A1 | 4/2016 | Bejcek | |
| 2020/0205338 A1 | 7/2020 | Zeiler | |
| 2021/0316785 A1* | 10/2021 | Ogura | A01D 34/824 |

FOREIGN PATENT DOCUMENTS

| | | | | |
|---|---|---|---|---|
| EP | | 1982572 A1 | 10/2008 | |
| WO | WO-2019035021 A1 * | | 2/2019 | ........... A01D 34/008 |

\* cited by examiner

*Primary Examiner* — Valentin Neacsu
*Assistant Examiner* — Marlon A Arce

(57) ABSTRACT

The disclosure provides a mower and a steering control method thereof. The mower includes a main body, a supporting part, and an operating part. The main body includes at least one driving wheel and a motor and the motor drives the driving wheel to move. The supporting part is connected to the main body for the operator to hold with both hands. The operating part is used to adjust the rotation speed and/or steering of the motor, the operating part is connected to the supporting part, and the operating part is configured to be operated when the operator holds the supporting part.

12 Claims, 5 Drawing Sheets

MOWER AND STEERING CONTROL METHOD THEREOF

CROSS REFERENCE TO RELATED APPLICATION

The present application is based on, and claims the priority from, Chinese application number CN202011565978.4, filed on Dec. 25, 2020, and Chinese application number CN 2020231818506, filed on Dec. 25, 2020, the disclosure of which is hereby incorporated by reference herein in its entirety for all purposes.

TECHNICAL FIELD

The disclosure relates to a mower and a steering control method thereof, which belongs to a field of outdoor power equipment.

BACKGROUND

At present, the electric-driven standing zero-turn mower is gradually replacing the traditional gasoline-driven standing zero-turn mower.

Since the operator is standing driving, the operator's hands must always hold the armrests to maintain body balance, while when switching between forward and reverse, the operator needs to change hands and hold front and rear different control levers so that the direction of the control levers can be switched. In a zero-turn turning, it is necessary to manipulate the left and right separately and operate in the reverse direction, which brings great inconvenience to the operator.

In view of this, it is indeed necessary to provide a mower and a steering control method thereof to solve the above problems.

SUMMARY

The disclosure provides a mower and a steering control method of the mower, so that the control is more convenient and safer.

The disclosure provides a mower. The mower includes a main body, a supporting part, and an operating part. The main body includes at least one driving wheel and a motor, wherein the motor drives the driving wheel to move; the supporting part is connected with the main body for the operator to hold with both hands; and the operating part is used to adjust a rotation speed and/or steering of the motor, wherein the operating part is connected to the supporting part and the operating part is configured to be operated when the operator holds the supporting part.

As a further improvement of the disclosure, there is a pair of operating parts, each operating part is provided with a detection component and a connector electrically connected to the detection component, and the detection component is used to send an operation signal according to a displacement generated by the operator's hand operation.

As a further improvement of the disclosure, the detection component is a potentiometer sensor which can generate different displacements and output corresponding voltage values according to the amplitude of the hand operation, the displacement includes linear displacement and/or angular displacement.

As a further improvement of the disclosure, the mower is further provided with a controller, the controller is electrically connected with the operating part through the connector, sends a control instruction to the mower according to the operation signal sent by the detection component, and the control instruction includes a forward/backward instruction, a turn instruction, and a zero turn instruction.

As a further improvement of the disclosure, the hand operation of the operator includes same direction operation of the pair of operating parts with left and right hands and opposite direction operation of the pair of operating parts with left and right hands.

As a further improvement of the disclosure, the same direction operation includes clockwise operation moving from an initial position to a front position and counterclockwise operation moving from the initial position to a rear position; the opposite direction operation includes counterclockwise operation with the left hand and clockwise operation with the right hand at the same time, and clockwise operation with the left hand and counterclockwise operation with the right hand at the same time.

As a further improvement of the disclosure, when the left and right hands operate at the same amplitude in the same direction, the control instruction is a forward/backward instruction.

When the left and right hands operate in the same direction with different amplitudes, the control instruction is a turning instruction.

When the left and right hands operate the same amplitude in opposite directions, the control instruction is a zero turn instruction.

As a further improvement of the disclosure, each of the pair of operating parts has a groove, and the operator can put a finger into the groove and toggle the groove to perform clockwise operation or counterclockwise operation, each of the pair of operating parts is provided with an elastic component, and the elastic component is used to reset the groove to an initial position.

As a further improvement of the disclosure, the groove can rotate around the pair of operating parts and generate angular displacement, and the rotation angle of the groove is between −30° and 30° compared to the initial position.

As a further improvement of the disclosure, the supporting part includes a first holding part and a second holding part, and the grooves are arranged mirror-symmetrically on the first holding part and the second holding part.

As a further improvement of the disclosure, the supporting part is an integral member, the first holding part and the second holding part are horizontally inclined and arranged in mirror-symmetry, and an angle between the first holding part and the second holding part at a connection thereof is an obtuse angle.

As a further improvement of the disclosure, the supporting part is arranged separately, the first holding part and the second holding part are vertically inclined and arranged in mirror-symmetry, and the first holding part and the second holding part are n-shaped.

As a further improvement of the disclosure, the pair of operating parts are arranged at both ends of the supporting part.

As a further improvement of the disclosure, the mower further includes a pair of safety switches, the pair of safety switches is used to control the on and off of an electromagnetic brake of the mower and establishes physical and electrical connections with the pair of operating parts respectively, so that the operator needs to press the pair of safety switches before operating the pair of operating parts, so as to control the mower to complete corresponding actions.

The disclosure further provides a steering control method which applies to the mower mentioned above, and the method includes:

S1: when both the left and right hands operate a steering control mechanism clockwise with the same amplitude, the control instruction being forward movement, when both the left and right hands operate the steering control mechanism counterclockwise with the same amplitude, the control instruction being backward movement, S2: when the left hand operates the steering control mechanism clockwise or counterclockwise, and the right hand operates in any direction and the operation amplitude thereof is smaller than the left hand operation amplitude, the control instruction being a forward right turn instruction or a backward right turn instruction respectively; when the right hand operates the steering mechanism clockwise or counterclockwise, and the left hand operates in any direction and the operation amplitude is smaller than the right hand operation amplitude, the control instruction being forward left turn instruction or a backward left turn instruction respectively;

S3: when the left hand is clockwise and the right hand is counterclockwise to operate the steering control mechanism at the same amplitude, the control instruction being zero turn instruction, when the right hand is clockwise and the left hand is counterclockwise to operate the steering mechanism with the same amplitude, the control instruction being a zero turn instruction.

The beneficial effects of the disclosure are: the disclosure has a simple structure and requires only hand movements with small amplitude to control forward/backward movement, turning and zero turn of the mower, effectively maintaining the stability and balance of the human center of gravity, and making the control more convenient and safer.

DETAILED DESCRIPTION

In order to make the purpose, technical solutions and advantages of the disclosure clearer, the disclosure will be described in detail below with reference to the accompanying drawings and specific embodiments.

The disclosure provides a first steering control mechanism 100 applied to an outdoor power equipment. The outdoor power equipment can be a mower or other types of outdoor power equipments, which will not be described in detail here and will not be limited. For clarity of description, the following part of the description will take the first steering control mechanism 100 applied to a mower as an example to describe the specific structure of the first steering control mechanism 100 in detail.

Figure 1:
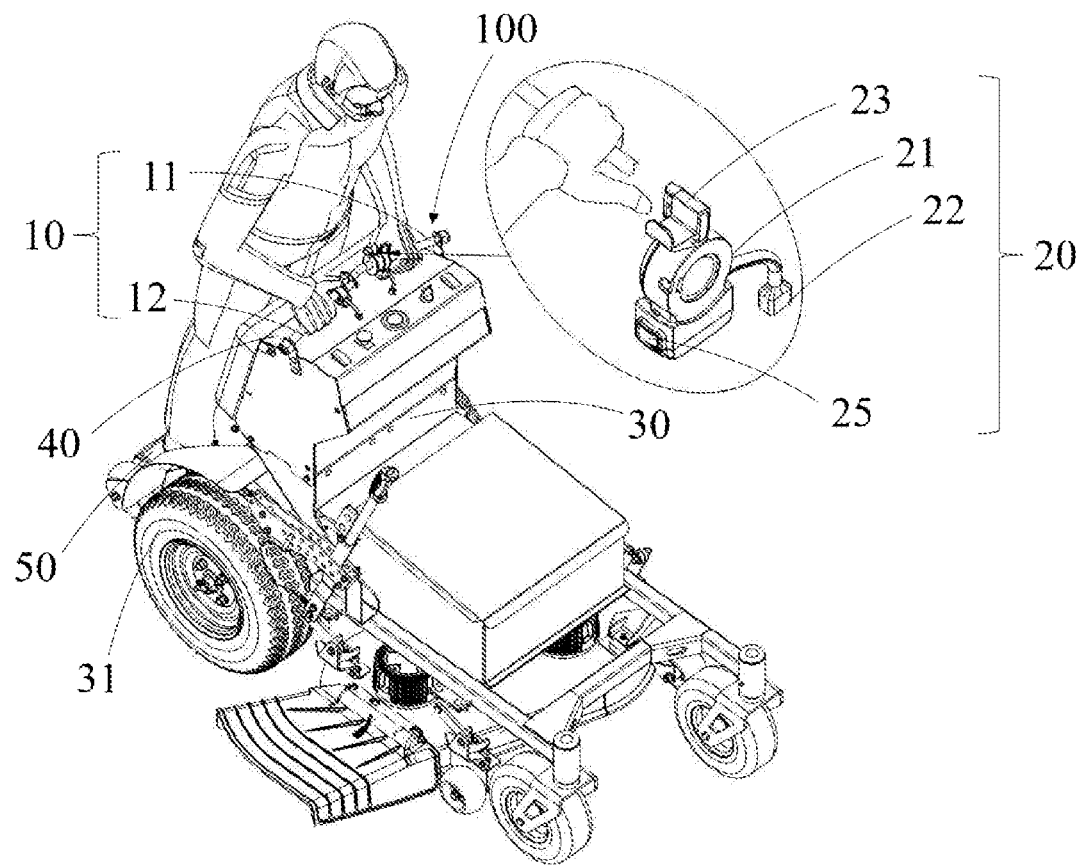
FIG. 1 is a structural view of a steering control mechanism applied to a mower according to a first embodiment of the disclosure.

As shown in FIG. 1, the mower includes a main body 30, an operation panel 40, and a platform 50. The main body 30 includes traveling wheels and a motor (not shown), the traveling wheels includes at least one driving wheel 31, and the motor is used to drive the driving wheel 31 to walk. Specifically, the mower is provided with a differential connected to the motor, the differential is used to realize that the traveling wheels on the left and right sides roll with different rotation speeds. Of course, the traveling wheels can also have other structures, including but not limited to hub motors and other forms, which are not limited here.

The operation panel 40 and the platform 50 are arranged at a rear end of the main body 30 of the mower, and the first steering control mechanism 100 is arranged on the operation panel 40 and is electrically connected to the controller (not shown) of the mower, which is convenient for the operator to stand on the platform 50 to operate.

Figure 2:
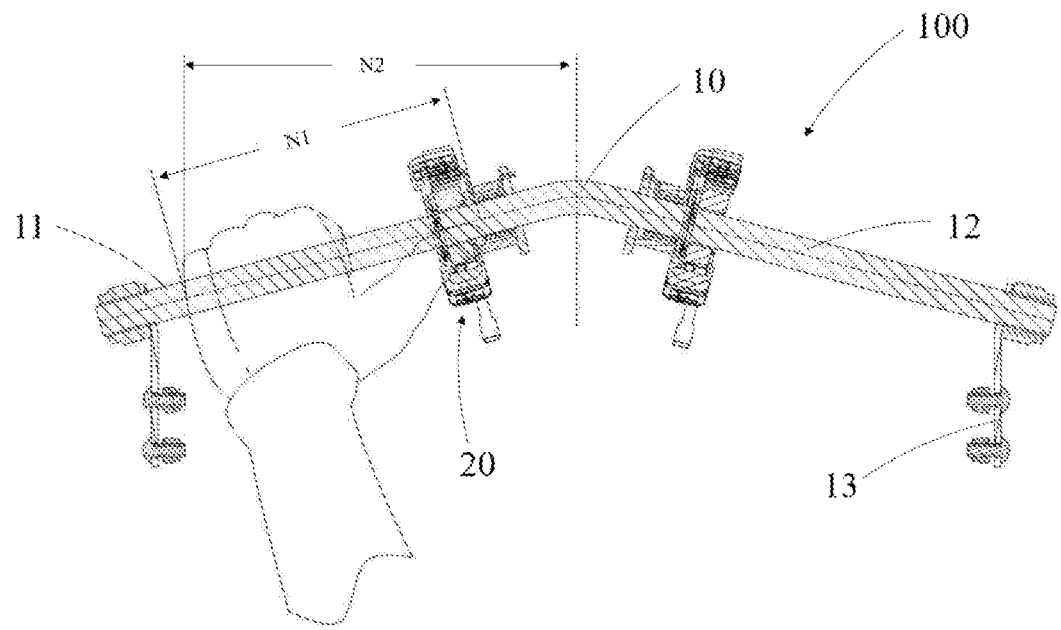
FIG. 2 is a cross-sectional structural view of the steering control mechanism of the disclosure.
Figure 3:
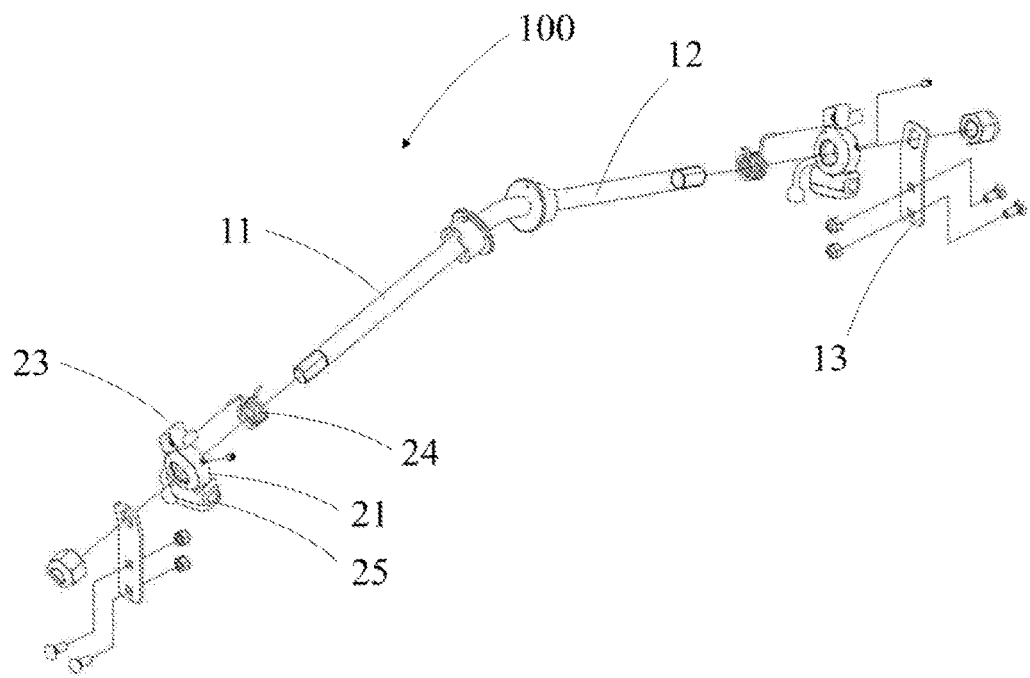
FIG. 3 is an exploded structure view of the steering control mechanism of the disclosure.

As shown in FIG. 2 and FIG. 3, the first steering control mechanism 100 includes a supporting part 10 for the user to hold with both hands. The supporting part 10 includes a first holding part 11 and a second holding part 12. The first holding part 11 and the second holding part 12 are respectively arranged on the left and right sides of the operation panel 40, and the first holding part 11 and the second holding part 12 are preferably mirror-symmetrical. Specifically, the supporting part 10 is installed on the operation panel 40 through a locking mechanism 13, and both ends of the supporting part 10 are connected with the locking mechanism 13. The first holding part 11 and the second holding part 12 of this embodiment are horizontally arranged and inclined, which is convenient for the operator to hold the first holding part 11 and the second holding part 12 horizontally with the left hand and the right hand, respectively, so that it can maintain the balance of the operator in the shaking of the mower and such a setting is more ergonomic.

In the embodiment of the disclosure, the first holding part 11 and the second holding part 12 can be fixedly connected, which means that the first holding part 11 and the second holding part 12 can be an integral member. The angle formed by the first holding part 11 and the second holding part 12 at the connection is an obtuse angle, so that the first holding part 11 and the second holding part 12 are in an inverted-V shape as a whole, which is convenient for both hands to hold. Specifically, the first holding part 11 and the second holding part 12 can be in the form of supporting rods, etc., which can be selected according to actual needs and will not limited here.

Specifically, the length of the hand holding part of the first holding part 11 and the second holding part 12 is set to N1, and the length of the first holding part 11 and the second holding part 12 in the horizontal direction is set to N2, where N1 is greater than or equal to 140 mm, and N2 is between 225 and 450 mm. According to experience, the average person's finger width except the thumb is L1, the distance from the purlicue (the part between the index and thumb) to the thumb finger tip is L2, and the distance between the outer edges of the fingers when both hand stretched straight forward, which means the shoulder width of an adult is L3, where L1 is between 80 and 100 mm, L2 is between 60 and 75 mm, and L3 is around 450 mm. The length of the hand holding part of the first holding part 11 and the second holding part 12 is the finger grip range, which means that N1≥L1+L2 and N1≥140 mm. When the horizontal length of the first holding part 11 and the second holding part 12 is greater than the width of human shoulder, it will make the operation inconvenient. At this time, it should be that 0.5L3≤N2≤L3, which means that N2 is between 225 and 450 mm.

The supporting part 10 is provided with an operating part 20 fixed on the supporting part 10, and the operating part 20 is configured to be operated when the operator holds the supporting part 10, so as to adjust the rotation speed of the motor and realize steering.

Specifically, there is a pair of operating parts 20, and the pair of operating parts 20 is respectively arranged on the first holding part 11 and the second holding part 12 and arranged in mirror-symmetry. The pair of operating parts 20 is used to send an operating signal according to the displacement generated by the operator's hand operation. The pair of operating parts 20 is used to control the movement of the mower. The operator can operate the pair of operating parts 20 with fingers when holding the first holding part 11 and the second holding part 12 with both hands instead of moving arms back and forth, which avoids problems such as instability of the center of gravity during the operation.

Further, each of the pair of operating parts 20 is provided with a groove 23, and the operator can put a finger into the groove 23 and toggle the groove 23 to operate clockwise or counterclockwise. The finger can be a thumb, and the detection component 21 described below can output a voltage signal by swinging back or forth of the thumb.

Figure 4:
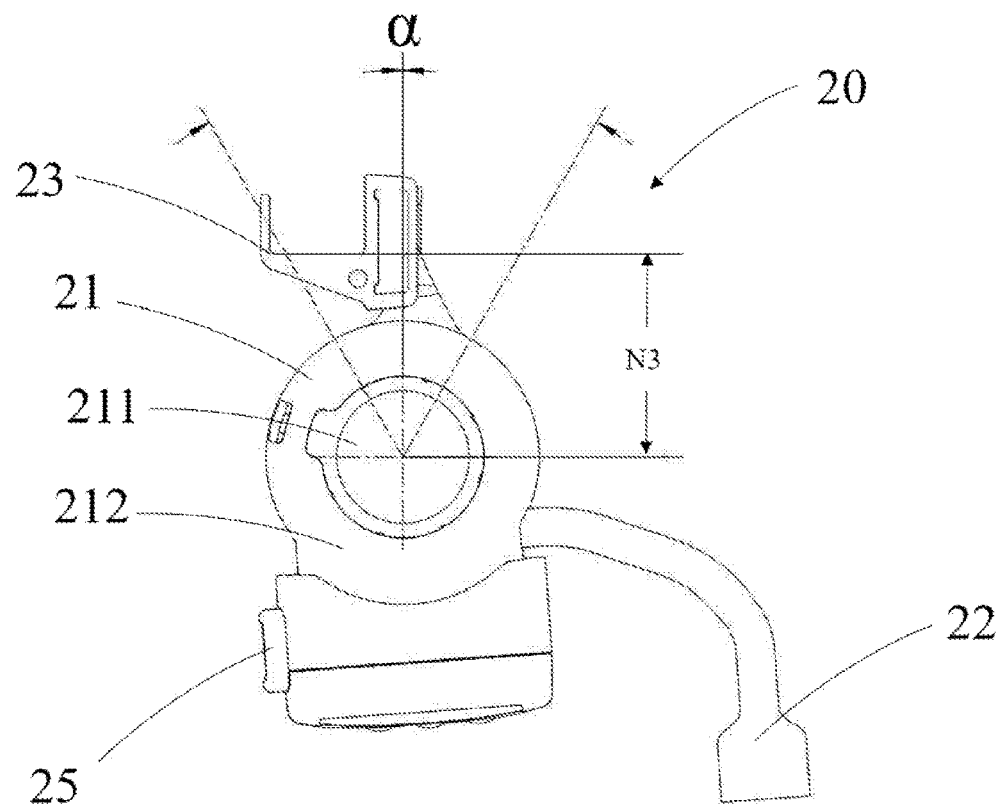
FIG. 4 is a structural view of a first holding part in the disclosure.

As shown in FIG. 4, specifically, the distance from the groove 23 to the finger gripping center of the supporting part 10 (which means the height of the groove 23) is N3, and in the embodiment of the disclosure, the height of the groove 23 N3 is between 50 and 70 mm. Due to the limited length of the thumb, and the angle α at which the groove 23 can rotate around the pair of operating parts 20 by controlling the thumb is also limited, the rotation angle α is between −30° and 30° in the disclosure.

The pair of operating parts 20 is also provided with an elastic component 24, one end of the elastic component 24 is connected with the groove 23, and the other end is arranged on the supporting part 10. The elastic component 24 is used to reset the groove 23 to the initial position, so that the controller can accurately realize the parking brake. In the disclosure, the elastic component 24 can be in a structure such as a return spring or a torsion spring, and the specific setting can be selected according to actual needs, which is not limited here.

Further, the pair of operating parts 20 is respectively provided with a detection component 21 and a connector 22 electrically connected to the detection component 21. The detection component 21 is used to send an operation signal according to the displacement generated by the operator's operation, and the controller is electrically connected with the operation parts 20 through the connector 22, so that a control instruction can be sent to the mower according to the operation signal sent by the detection component 21. In this embodiment, the detection component 21 is a potentiometer sensor, which can generate different displacements and output a corresponding voltage value according to the amplitude of the operation to output a voltage signal. The displacement includes linear displacement and/or angular displacement. In the disclosure, the groove 23 can be used to generate angular displacement, which means that the pair of operating parts 20 generates angular displacement of their own operating states and the detection component 21 converts the angular displacement into a corresponding voltage value, and an operation signal is sent to the controller, so that the controller can send a control instruction according to the corresponding voltage value to control the forward/backward, turning or zero turn of the mower. And the controller also can control the speed of the mower according to the magnitude of the specific angular displacement. Of course, in other embodiments, the detection component 21 may also be other devices for detecting operation, including but not limited to a displacement sensor, a light sensor, or a pressure sensor, which is not limited here.

Specifically, the hang operation of the operator includes same direction operation of the pair of operating parts 20 with left and right hands and opposite direction operation of the pair of operating parts 20 with left and right hands. The same direction operation includes clockwise operation moving from the initial position to the front position and counterclockwise operation moving from the initial position to the rear position; the opposite direction operation includes counterclockwise operation with the left hand and clockwise operation with the right hand at the same time, and clockwise operation with the left hand and counterclockwise operation with the right hand at the same time.

Furthermore, the operating part 20 includes a fixed part 211 and a rotating part 212, wherein the fixed part 211 is fixed on the supporting part 10, the rotating part 212 can rotate relative to the fixed part 211. The detection component 21 is used to detect the rotation angle of the rotating part 212 relative to the fixed part 211. Specifically, the rotating part 212 can rotate bi-directionally relative to the fixed part 211, and the groove 23 is provided on the rotating part 212 and drives the rotating part 212 to rotate synchronously, which facilitates the operation with fingers. The fixed part 211 is provided with a first position, a second position, and a third position, wherein the second position is the initial position of the rotating part 212 and the second position is between the first position and the third position. The third position is the maximum position where the rotating part 212 rotates, and the first position is the maximum position where the rotating part 212 rotates in the reverse direction. When the rotating part 212 is at the first position, the voltage value output by the detection component 21 is the minimum value, when the rotating part 212 is at the third position, the voltage value output by the detection component 21 is the maximum value.

Figure 5:
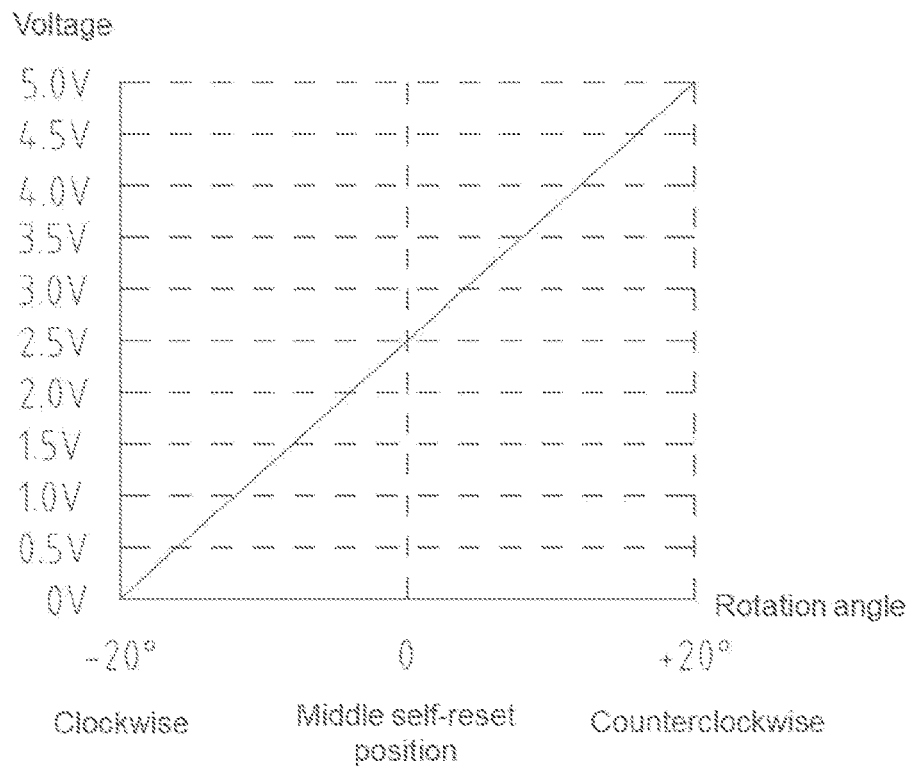
FIG. 5 is a diagram of a corresponding relationship between a rotation angle of a groove and the voltage value output by the detection component in FIG. 4.
Figure 6:
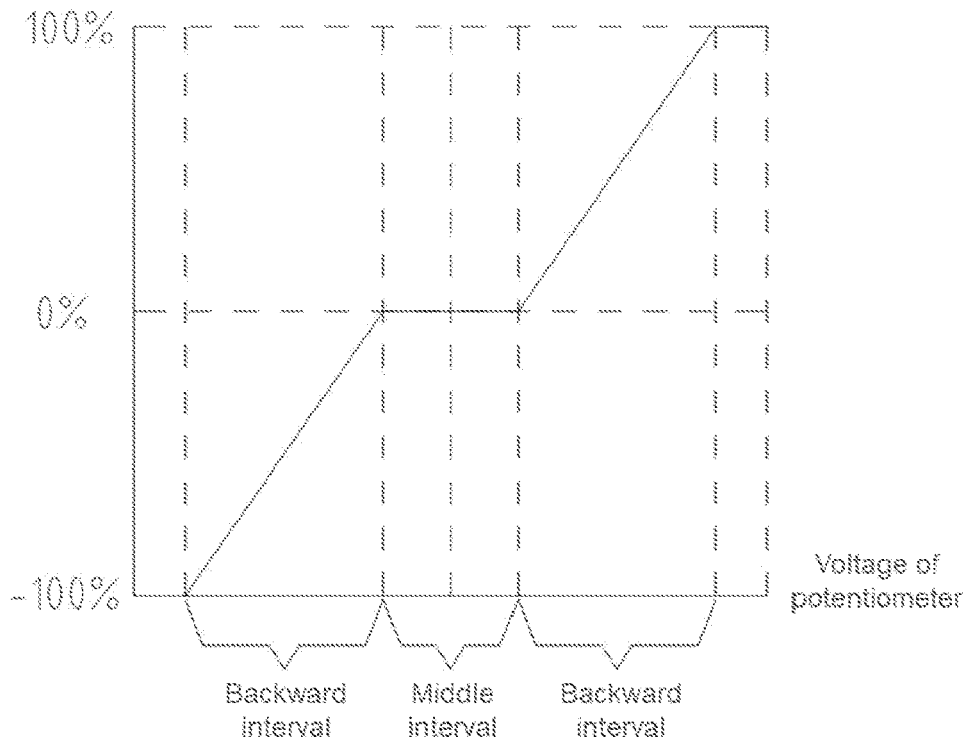
FIG. 6 is a diagram of a corresponding relationship between the voltage value output by the detection component and the output value of the controller rotation speed in FIG. 5.

As shown in FIG. 5 and FIG. 6, in a preferred embodiment of the disclosure, the voltage value range output by the detection component 21 can be set from 0 to 5V, which means that when the rotating part 212 is at the first position, the voltage value output by the detection component 21 is 0V, when the rotating part 212 is at the third position, the voltage value output by the detection component 21 is 5V. Correspondingly, the rotation angle α of the rotating part 212 is set from −20° to 20°, and the voltage value range output by the detection component 21 is positively linearly related to the rotation angle α, which means that when the rotation angle α of the pair of operating parts 20 is −20°, 0°, and 20°, it is respectively corresponds the rear end position, the initial position and the front end position. Simultaneously, the corresponding output voltage values of the detection component 21 are 0V, 2.5V and 5V respectively. In other words, clockwise rotation the pair of operating parts 20 can output a high voltage signal, and counterclockwise rotation can output a low voltage signal.

In a specific embodiment of the disclosure, when the pair of operating parts 20 both rotate clockwise to output a high voltage signal, the controller will send a control instruction to the mower to drive the left wheel and the right wheel to move forward, when the pair of operating parts 20 both rotate counterclockwise to output a low voltage signal, the controller will send a control instruction to the mower to drive the left wheel and the right wheel to move backward respectively.

Furthermore, when the left and right hands operate at the same amplitude in the same direction, the control instruction is a forward/backward instruction, when the left and right hands operate in the same direction with different amplitudes, the control instruction is a turning instruction, when the left and right hands operate the same amplitude in opposite directions, the control instruction is a zero turn instruction.

Correspondingly, the rotation speed output by the controller of the mower, which means the forward or backward speed of the left and right wheels depends on the specific voltage value output by the detection component 21. When the voltage value output by the detection component 21 is in the range of (2.5, 5], as the voltage value increases, the rotation speed output by the controller increases, and the corresponding range of the rotation speed output by the controller is from 0 to 100%, when the voltage value output by the detection component 21 is in the range of [0, 2.5), as the voltage value decreases, the rotation speed output by the controller increases in the opposite direction, and the corresponding range of the rotation speed output by the controller is from 0 to 100%. That is to say, the voltage value range (2.5, 5] is the forward interval, and the voltage value range [0, 2.5) is the backward interval. When the voltage value output by the detection component 21 is about 2.5V, the pair of the operating parts 20 is in the initial position, and the output rotation speed of the controller is 0, which is in the middle interval. The specific range of the middle interval can be set as required. Of course, the range of the middle interval cannot be set too small in order to facilitate operations by the operator.

Figure 7:
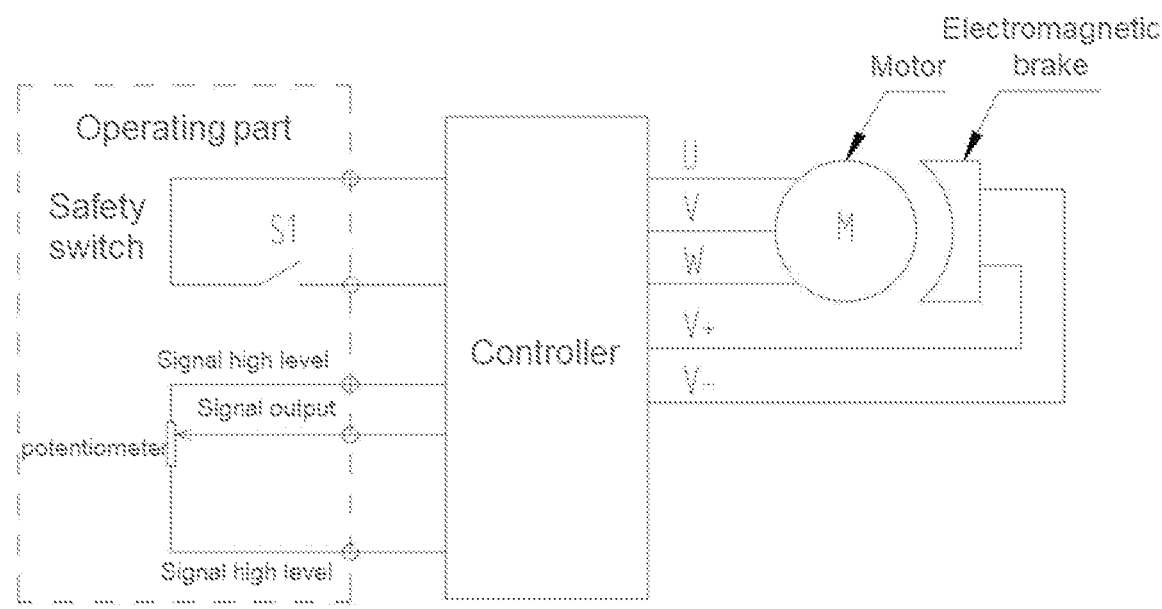
FIG. 7 is a circuit structure view of a controller and other components in the disclosure.

As shown in FIG. 4 and FIG. 7, the pair of operating parts 20 is further provided with safety switches 25, the safety switches 25 can be used to control the connection and disconnection of an electromagnetic brake of the outdoor power equipment, and respectively establishes a physical and electrical connection with the pair of the operating parts 20, so that the operator needs to press the pair of safety switches 25 before operating the pair of operating parts 20 so as to control the corresponding actions performed by the outdoor power equipment. The pair of operating parts 20 is in a locked state before the safety switches 25 are triggered, and has no response to any operation. Only after the safety switches 25 are triggered, which means that after the operator ensures the safety of operation and activates the safety switches 25, the pair of operating parts 20 can be operated and used. The purpose is to realize the "double action" operation, which can effectively avoid misoperations.

Figure 8:
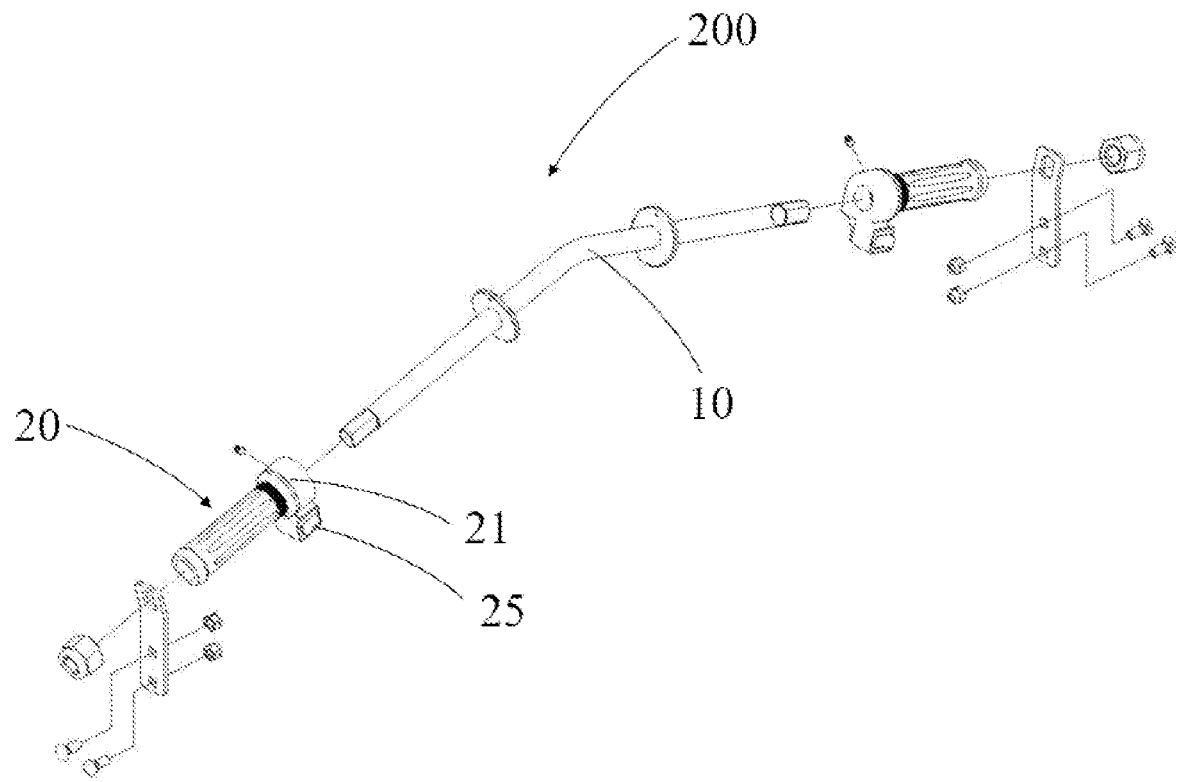
FIG. 8 is an exploded structural view of a steering control mechanism according to a second embodiment of the disclosure.

As shown in FIG. 8, in the second embodiment of the disclosure, the disclosure also provides a second steering control mechanism 200, the second steering control mechanism 200 includes a supporting part 10, and the supporting part 10 includes a first holding part 11 and a second holding part 12. Wherein, the first holding part 11 and the second holding part 12 are horizontally inclined and arranged in mirror-symmetry, and the angle between the first holding part 11 and the second holding part 12 at the connection thereof is an obtuse angle. Both of the first holding part 11 and the second holding part 12 are also provided with a pair of operating parts 20. Wherein, the structures of the first holding part 11 and the second holding part 12 are the same as the structure of the first steering control mechanism 100 of the first embodiment described above, and the pair of operating parts 20 are speed control knobs. The speed control knob 20 is arranged at both ends of the supporting part 10, and includes a detection member 21, an elastic component 24, and a safety switch 25 in the first embodiment as shown in FIG. 3. Since the structures of the detecting member 21, the elastic component 24 and the safety switch 25 are the same as those in the first embodiment, which will not be repeated here. The speed control knobs are respectively arranged on the first holding part 11 and the second holding part 12, and the two speed control knobs 20 are mirror-symmetrical. In this embodiment, the rotation angle of the speed control knob 20 is preferably set from −20° to 20°, and the operator can control the forward or backward movement of the corresponding wheel through adjusting the speed control knob clockwise or counterclockwise.

Figure 9:
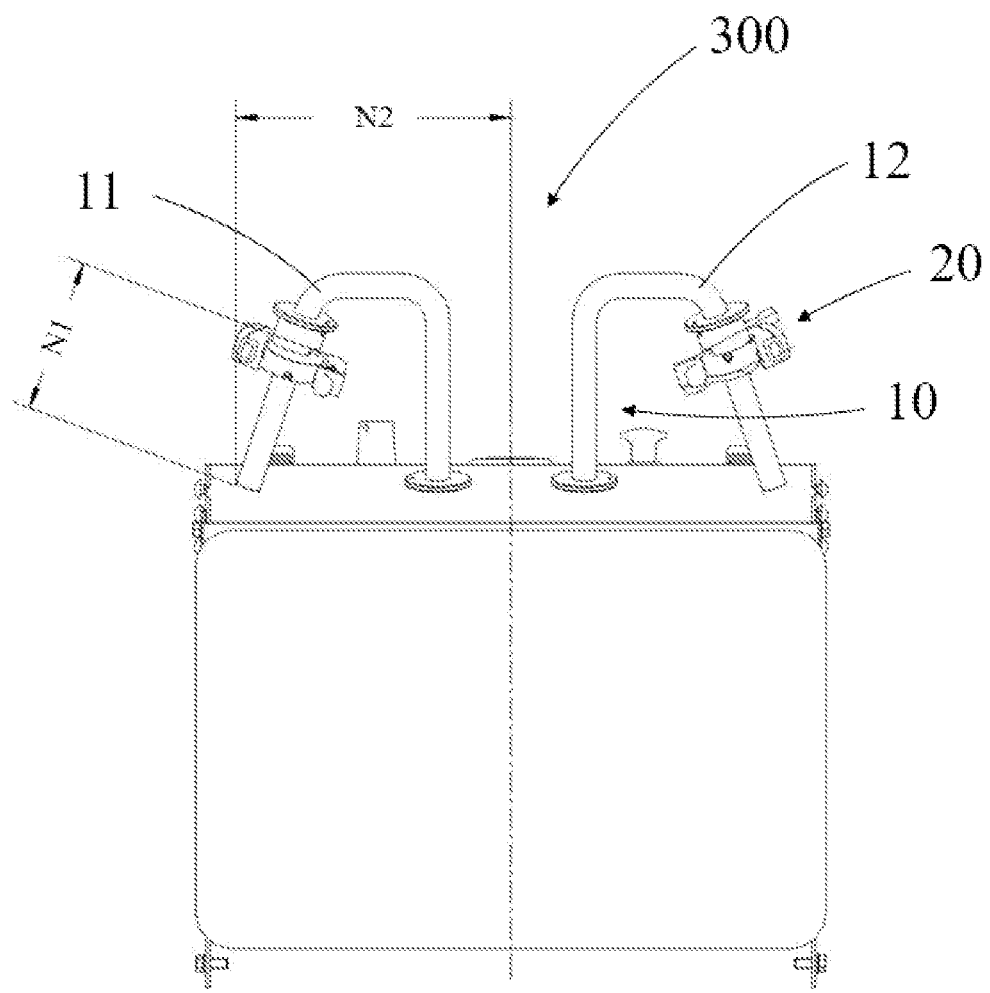
FIG. 9 is a schematic structural view of a steering control mechanism according to a third embodiment of the disclosure.

As shown in FIG. 9, in the third embodiment of the disclosure, the disclosure also provides a third steering control mechanism 300, the third steering control mechanism 300 includes a supporting part 10, and the supporting part 10 includes a first holding 11 and a second holding part 12. Wherein, the first holding part 11 and the second holding part 12 are inclined in the vertical direction and are preferably arranged in mirror-symmetry. The first holding part 11 and the second holding part 12 are n-shaped, which is convenient for the operator to hold the first holding part 11 and the second holding part 12 vertically with his left hand and right hand respectively, so as to maintain the operator's balance in the shaking of the mower. At this time, the length of the holding part of the first holding part 11 and the second holding part 12 is still set to N1, and the length of the first holding part 11 and the second holding part 12 in the horizontal direction is still set to N2, where N1 is greater than or equal to 140 mm, and N2 is between 225 and 450 mm.

The disclosure also provides a control method for a mower with a first steering control mechanism 100, the method includes:
  S1: when both the left and right hands operate the steering control mechanism clockwise with the same amplitude, the mower being in a forward state.
  When both the left and right hands operate the steering control mechanism counterclockwise with the same amplitude, the mower being in a backward state.
  S2: when the left hand operates the steering control mechanism clockwise or counterclockwise, and the right hand operates in any direction and the operation amplitude thereof is smaller than the left hand operation amplitude, the turning center being on the right side, and the mower being in a forward right turning state or a backward right turning state.
  when the right hand operates the steering mechanism clockwise or counterclockwise, and the left hand operates in any direction and the operation amplitude is smaller than the right hand operation amplitude, the turning center being on the left side, and the mower being in a forward left turning state or a backward left turning state.
  S3: when the left hand is clockwise and the right hand is counterclockwise to operate the steering control mechanism at the same amplitude, the mower being in a zero turn turning state to the right;

when the right hand is clockwise and the left hand is counterclockwise to operate the steering mechanism with the same amplitude, the mower is in a zero turn turning state to the left.

In summary, the disclosure has a simple structure and requires only hand movements with small amplitude to control forward/backward movement, turning and zero turn of the outdoor power equipment, effectively maintaining the stability and balance of the human center of gravity, and making the control more convenient and safer.

The above embodiments are only used to illustrate the technical solution of the disclosure and not to limit it. Although the disclosure is described in detail with reference to the preferred embodiments, those of ordinary skill in the art should understand that the technical solution of the disclosure can be modified or replaced without departing from the spirit and scope of the technical solution of the disclosure.

What is claimed is:

1. A mower, comprising:
a main body, comprising at least one driving wheel and a motor, wherein the motor drives the driving wheel to move,
a supporting part, connected with the main body for an operator to hold with both hands, and
an operating part, used to adjust a rotation speed and/or steering of the motor, wherein the operating part is connected to the supporting part and the operating part is configured to be operated when the operator holds the supporting part,
wherein the operating part is provided with a pair, each operating part is provided with a detection component and a connector electrically connected to the detection component, and the detection component is used to send an operation signal according to a displacement generated by the operator's hand operation;
wherein the supporting part is arranged separately and comprises a first holding part and a second holding part, the first holding part and the second holding part are vertically inclined and arranged in mirror-symmetry, and the first holding part and the second holding part are n-shaped.

2. The mower according to claim 1, wherein
the detection component is a potentiometer sensor, the potentiometer sensor is capable of generating different displacements and outputting corresponding voltage values according to an amplitude of the hand operation, the displacement comprises linear displacement and/or angular displacement.

3. The mower according to claim 2, further comprising a controller, wherein
the controller is electrically connected with the operating part through the connector, sends a control instruction to the mower according to the operation signal sent by the detection component, and the control instruction comprises a forward/backward instruction, a turn instruction, and a zero turn instruction.

4. The mower according to claim 3, wherein
a direction of the hand operation of the operator comprises same direction operation of the pair of operating parts with left and right hands and opposite direction operation of the pair of operating parts with left and right hands, the same direction operation comprises clockwise operation moving from an initial position to a front position with both the left and right hands and counterclockwise operation moving from the initial position to a rear position with both the left and right hands, the opposite direction operation comprises counterclockwise operation with the left hand and clockwise operation with the right hand at the same time, and clockwise operation with the left hand and counterclockwise operation with the right hand at the same time.

5. The mower according to claim 4, wherein
when the left and right hands operate at the same amplitude in the same direction, the control instruction is a forward/backward instruction,
when the left and right hands operate in the same direction with different amplitudes, the control instruction is a turning instruction, and
when the left and right hands operate the same amplitude in opposite directions, the control instruction is a zero turn instruction.

6. The mower according to claim 5, wherein
each of the pair of operating parts has a groove enabling the operator to put a finger into the groove and toggle the groove to perform clockwise operation or counterclockwise operation, each of the pair of operating parts is provided with an elastic component, and the elastic component is used to reset the groove to an initial position.

7. The mower according to claim 6, wherein
the groove is capable of rotating around the pair of operating parts and generating angular displacement, and a rotation angle of the groove is between −30° and 30° compared to an initial position.

8. The mower according to claim 7, wherein
the grooves are arranged mirror-symmetrically on the first holding part and the second holding part.

9. The mower according to claim 8, wherein
the supporting part is an integral member, the first holding part and the second holding part are horizontally inclined and arranged in mirror-symmetry, and an angle between the first holding part and the second holding part at a connection thereof is an obtuse angle.

10. The mower according to claim 5, wherein
the pair of operating parts are arranged at both ends of the supporting part.

11. The mower according to claim 1, further comprising a pair of safety switches, wherein
the pair of safety switches is used to control the on and off of an electromagnetic brake of the mower and respectively establishes physical and electrical connections with the pair of operating parts, so that the pair of safety switches needs to be pressed before operating the pair of operating parts, so as to control the mower to complete corresponding actions.

12. A steering control method, the method being applied to the mower of claim 1, comprising
controlling the mower to move forward when both left and right hands operate a steering control mechanism clockwise with the same amplitude, controlling the mower to move backward when both the left and right hands operate the steering control mechanism counterclockwise with the same amplitude,
controlling the mower to perform a forward right turn or backward right turn when the left hand operates the steering control mechanism clockwise or counterclockwise and the right hand operates in any direction and the operation amplitude thereof is smaller than the left hand operation amplitude; controlling the mower to perform a forward left turn or backward left turn when the right hand operates the steering mechanism clockwise or counterclockwise and the left hand operates in any direction and the operation amplitude is smaller than the right hand operation amplitude, and controlling the mower to perform a zero turn when the left hand is clockwise and the right hand is counterclockwise to operate the steering control mechanism at the same amplitude, or when the right hand is clockwise and the left hand is counterclockwise to operate the steering mechanism with the same amplitude.

* * * * *